A. Tyrrell.
Horseshoe.

N° 43,650. Patented July 26, 1864.

Witnesses;
N. U. Soper
H. M. Warren

Inventor;
Alexander Tyrrell

UNITED STATES PATENT OFFICE.

ALEXANDER TYRRELL, OF BATAVIA, NEW YORK.

IMPROVED HORSESHOE.

Specification forming part of Letters Patent No. 43,650, dated July 26, 1864.

*To all whom it may concern:*

Be it known that I, ALEXANDER TYRRELL, of Batavia, in the county of Genesee and State of New York, have invented a new and Improved Horseshoe, to cure and prevent the contraction of the hoofs of horses; and I do hereby declare that the following is a full and exact description thereof, reference being had to the accompanying drawings, and to the letters of reference marked thereon.

The nature of my invention consists in making a horseshoe having the usual corks on the under side, and with projections at the rear ends of the shoe on the upper side, which fit in and against which the inside of the outer part of the hoof at the back part rests, affording a firm support and shoulder, so that by expanding the shoe after the same is nailed to the hoof, the hoof will be expanded and held in the desired position.

To enable others skilled in the art to make and use my invention, I will proceed to describe its construction and operation.

Figure 1:
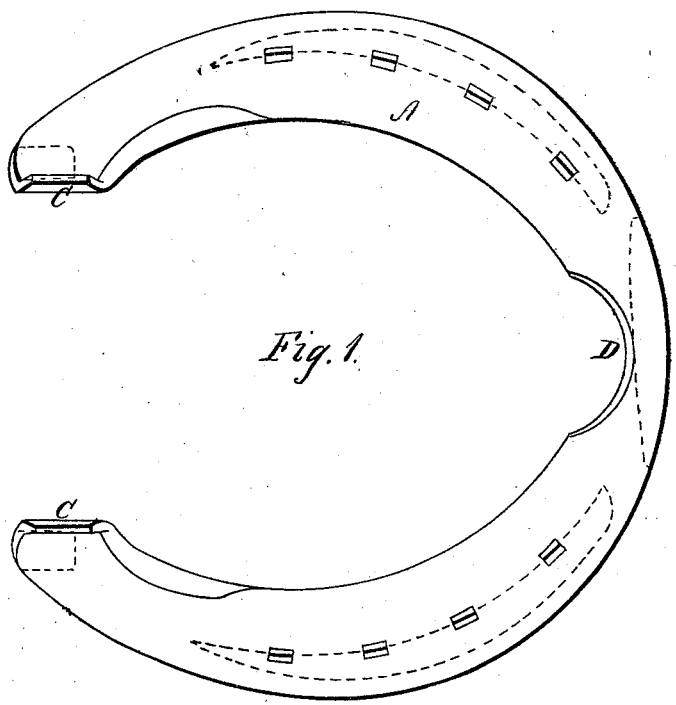
Figure 2:
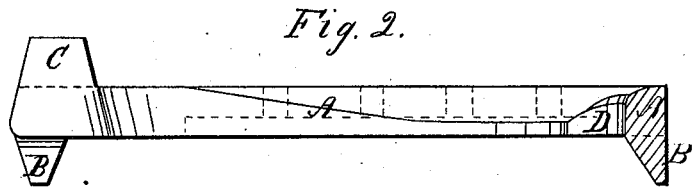

In the drawings, Figure 1 is a top or plan of my improved horseshoe, showing the upper side resting against the hoof. Fig. 2 is a sectional elevation.

I make a horseshoe in the ordinary form in its general outline, with the forward or toe part made narrower than is usual, to allow the same to be spread open more readily. I attach corks to the bottom of the shoe in the usual form, or it may be made without any corks upon the under side, and in many cases of severe contraction of the hoof it would be preferable to do so. At the rear ends of the shoe, upon the upper side, I attach projections on the side of the shoe, not high enough to have the inside of the hoof press upon the top of them, and fitted against the inside of the outer part of the hoof in the cavity between the frog and the said outer part of the hoof, and after having fitted the hoof and shoe together I nail the shoe to the hoof, and with a pair of blacksmith's tongs or some other suitable instrument open and spread the shoe at the rear end, and consequently the contracted hoof, and it may be done by degrees from day to day, and the hoof will always be held and retained in position by the shoe thus spread. The effect of it is to prevent the sides of the hoof from pressing upon a cross-bone, which makes the horse lame, and keeping the hoof thus spread, it will gradually assume a healthy form.

It is important to make the front part of the shoe narrower than the remaining part, to allow the spreading of it more readily; otherwise the spreading of the shoe would loosen it from the hoof. The projections at the ends are marked C C.

Having thus described my invention, what I claim as my invention is as follows:

Making a horseshoe with shoulders or projections upon the upper side of the rear ends, and making the same narrower at the toe than the other parts of the shoe, substantially as and for the purposes described.

Dated June 14, 1864.

A. TYRRELL.

In presence of—
   H. U. SOPER,
   H. M. WARREN.